United States Patent [19]

Baston et al.

[11] Patent Number: 4,903,736

[45] Date of Patent: Feb. 27, 1990

[54] HOLLOW CYLINDRICAL BODY MADE FROM SPIRALLY WOUND EXTRUDED PLASTIC STRIP MATERIAL

[75] Inventors: Artur Baston, Homburg-Einod; Karl-Heinz Baston, Contwig, both of Fed. Rep. of Germany

[73] Assignee: Vobau Artur Baston Gesellschaft für Vorrichtungsbau mit Beschränkter Haftung, Blieskastel-Breitfurt, Fed. Rep. of Germany

[21] Appl. No.: 197,562

[22] Filed: May 23, 1988

[30] Foreign Application Priority Data

May 23, 1987 [DE] Fed. Rep. of Germany ....... 3717418

[51] Int. Cl.⁴ .............................. F16L 9/16; B23B 3/04
[52] U.S. Cl. ..................................... 138/154; 138/122; 138/129; 428/192
[58] Field of Search ............... 138/121, 122, 129, 154, 138/173, 148; 428/126–129, 192

[56] References Cited

U.S. PATENT DOCUMENTS

| | | |
|---|---|---|
| 2,731,040 | 1/1956 | Warburton ........................ 138/129 |
| 4,167,645 | 9/1979 | Carey ................................ 138/129 X |
| 4,435,460 | 3/1984 | Menzel ............................. 138/154 X |
| 4,719,945 | 1/1988 | Richards et al. ................. 138/154 X |

FOREIGN PATENT DOCUMENTS

| | | |
|---|---|---|
| 0134987 | 3/1985 | European Pat. Off. . |
| 1284746 | 8/1969 | Fed. Rep. of Germany . |
| 1911326 | 11/1970 | Fed. Rep. of Germany . |
| 2308417 | 8/1976 | Fed. Rep. of Germany . |
| 3516628 | 11/1986 | Fed. Rep. of Germany . |
| 1483914 | 5/1967 | France ................................ 138/129 |

Primary Examiner—James E. Bryant, III
Attorney, Agent, or Firm—Toren, McGeady & Associates

[57] ABSTRACT

For the production of a hollow cylindrical body, for example a tube or a container, first a bottom channel (1) is wound spirally onto a mandrel. A top channel (2) is wound on to the bottom channel (1) offset by half the channel width. The top and bottom channel (1, 2) both have an approximately E-shaped cross section with two outside flanges (3, 4) and two middle flanges (5, 6). The distance between the two middle flanges (5, 6) correspond to the combined thicknesses of the two outside flanges (3, 4). The confronting surfaces (7, 8) of the two outside flanges (3, 4) and of the two middle flanges (5, 6) are provided with a sawtooth cross-sectional shape, so that an inseparable, interlocking connection results between the bottom channel (1) and the top channel (2). The bottom channel (1) and top channel (2) can consist of different plastic materials.

14 Claims, 2 Drawing Sheets

HOLLOW CYLINDRICAL BODY MADE FROM SPIRALLY WOUND EXTRUDED PLASTIC STRIP MATERIAL

FIELD AND BACKGROUND OF THE INVENTION

The invention relates to a hollow cylindrical body, e.g. a tube or a container, comprising an extruded, hollow plastic strip which is wound spirally on a mandrel and whose contiguous lateral walls are bound together.

Hollow bodies of this kind and the extruded plastic shapes that can be used in making them are known, for example, from German Patent Nos. 12 84 746 and 23 08 417, German OS Nos. 35 16 628 and 19 11 326 as well as European Patent No. EP-A-0 134 987. The tubes described in German OS No. 19 11 326 or EP-A No. 0 134 987 have a corrugated outside surface so that the leak-proof attachment of couplings and the like is problematical. In this respect, the tubes described in German Patents Nos. 12 84 746 or 23 08 417, are better, where the inside and outside walls are substantially smooth. The individual layers have to be cemented or welded together so that attachment is possible only at the factory. The hollow-walled extruded plastic shapes permit only the production of hollow bodies of relatively great diameter. Furthermore, extrusion of the hollow-walled plastic shapes calls for relatively complex and, hence, expensive dies.

SUMMARY OF THE INVENTION

The present invention addresses the problem of devising a hollow cylindrical body of the kind described above which can be made in a far more flexible manner, using economical and easily produced extruded plastic shapes.

This problem is solved in that an extruded bottom channel and top channel are provided, the bottom and top channels having an E-like cross section with two outside flanges and two middle flanges that can be snapped into one another.

The use of open plastic shapes permits them to be made with simpler dies and enables them to be bent around mandrels of relatively small diameter. Furthermore, the plastic channels can be made on-site, so that the final size of the hollow body can be well adapted to the requirements. If the external cross sections of the top and bottom channels are sharp-cornered, the result is the desired smooth inside and especially outside flanges of the finished hollow body. The finished hollow bodies are light, but, nevertheless, very stable.

According to a preferred embodiment of the invention, the top and bottom channels are identical. This facilitates production and transportation of the plastic extrusions and reduces their cost.

According to a further development of the invention, the distance between the two middle flanges corresponds to the combined thickness of the two outer flanges. In this manner, the bottom and top channels can be joined tightly together in a simple manner.

At the same time, it is of special advantage if the confronting surfaces of the two outer flanges and of the two middle flanges are provided with undercutting, e.g. having a sawtooth shape. In this case, it is sufficient to press the top channel onto the bottom channel which is already wound onto the mandrel. Usually no additional sealing in the form of cementing or welding is necessary.

According to a further development of the invention, truss webs extend from the middle flanges to the bases of the bottom and top channels. These trusses support the middle flanges and thus improve the seal between the assembled top and bottom channels. Also, this causes the formation of a plurality of sealed chambers or passages in the flanges of the hollow body, making it possible to carry different fluids in the different chambers, for heat exchanging purposes, for example.

According to a further development of the invention, the bottom channel and top channel are made of different materials. One embodiment provides for an upper channel to be transparent, for example, to permit the entry of radiant heat. Another embodiment provides that the bottom channel is resistant to chemicals which are stored or transported in the hollow body, while the outer channel can consist of a different, economical material, for example.

In order to improve the strength of the finished hollow body, it is possible according to a preferred further development of the invention, to wind a reinforcement in the form of a fiber ribbon or steel band into the bottom channel. Laying this reinforcement into the open channel is especially simple.

Further, it is possible to weld or cement together the flanges of the bottom and top channels during their assembly.

Accordingly, an object of the present invention is to provide a cylindrical hollow body which comprises a bottom spirally wound channel having turns with adjacent side walls lying closely against each other, and a top spirally wound channel interengaged with said bottom channel, said top channel having turns with adjacent side walls lying closely against each other, said top and bottom channels each having an E-shaped cross section with a base web having two outer limbs each carrying one side wall of the channel, and two middle limbs, said middle limbs of one channel being spaced apart by a distance to receive the outer limbs of two adjacent turns of the other channel.

A method of assembling a hollow body from a top and a bottom spirally wound channel which are interengaged with each other is also provided.

The various features of novelty which characterize the invention are pointed out with particularity in the claims annexed to and forming a part of this disclosure. For a better understanding of the invention, its operating advantages and specific objects attained by its uses, reference is made to the accompanying descriptive material in which preferred embodiments of the invention are illustrated.

DESCRIPTION OF THE PREFERRED EMBODIMENTS

Figure 1:
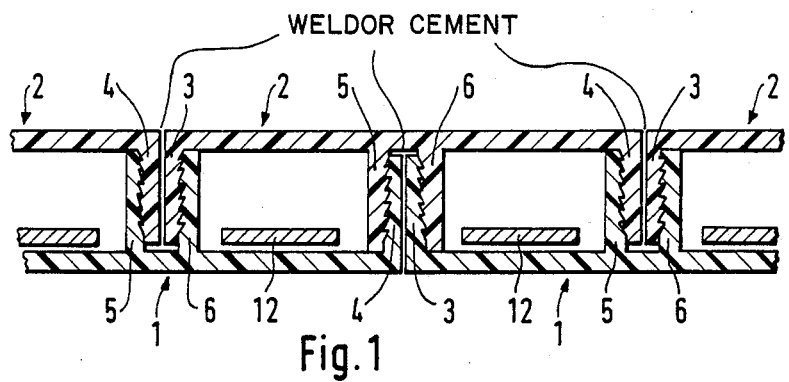
FIG. 1 is a cross-sectional view through one wall of a first embodiment of the hollow body.

Referring to the drawings in particular, the invention embodied therein comprises a cylindrical hollow body having a cross section as shown in FIG. 1.

FIG. 1 shows a detail of a cross section through a wall of the hollow cylindrical body, such as a tube or container, for example. To make this structure, first a plastic channel 1 is wound spirally onto a mandrel (shown at 20 in FIG. 5). Then a top channel 2 is snapped onto the bottom channel 1. The finished hollow body is extremely inexpensive and light as well as very stable in shape.

The bottom channel 1 and top channel 2 are identical in this embodiment. They have an approximately E-shaped cross section with a base web 11 which carries two outer flanges 3 and 4 and two middle flanges 5 and 6. The distance between the two middle flanges or links 5 and 6 corresponds to the combined thickness of the two outer flanges or limbs 3 and 4. When the top channel 2 is snapped onto the bottom channel 1, the latter is offset laterally by one-half the width of a channel. Thus, the adjacent outside flanges 3 and 4 of adjacent turns of top channel 2 come between the two middle flanges 5 and 6 of the bottom channel 1.

Before the top channel 2 is placed on the bottom channel 1 and with bottom channel 1 already wound on the mandrel, a reinforcement 12, in the form for example of a ribbon of glass, plastic or a steel band, can be laid into the bottom channel. This considerably increases the strength of the wall of the finished hollow body without the need for the use of expensive materials, such as fiber-reinforced plastics in making the channels 1 and 2.

Figure 2:
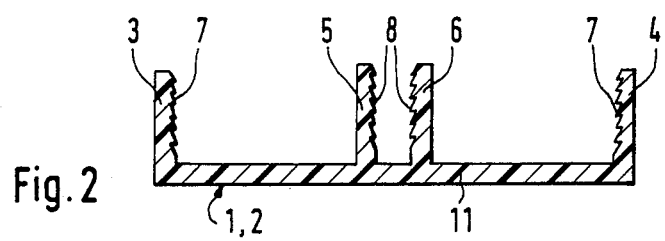
FIG. 2 is an enlarged cross-sectional view through a plastic channel of FIG. 1.

FIG. 2 is an enlarged cross section through a plastic extrusion for a top and bottom channel 1 and 2.

The confronting surfaces of the outer flanges 3 and 4 and of the middle flanges 5 and 6 are provided with sawtooth undercuts 7 and 8 so that when the bottom and top channels are assembled together, the result will be an inseparable interlocking junction whose strength and tightness will be usually sufficient, but can be improved if necessary by welding or cementing.

It is recommended that the outer cross section of the plastic channels 1 and 2 be made as smooth and sharp cornered as possible so that the finished hollow body will have the desired smooth inside and outside surface to facilitate the installation of couplings and the like. It is not necessary that the channel be rectangular; skewed shapes can also be used.

Figure 3:
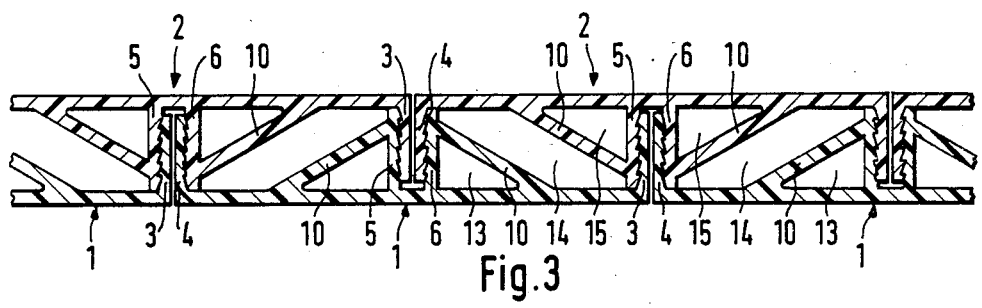
FIG. 3 is a cross-sectional view through the flange of a second embodiment of the hollow body.
Figure 4:
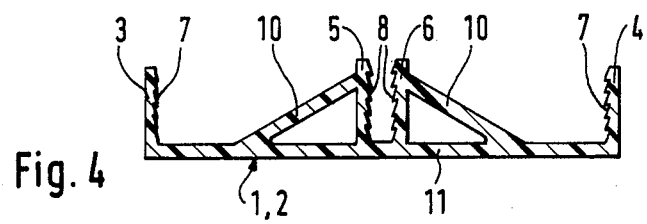
FIG. 4 is an enlarged cross-sectional view through a plastic channel of FIG. 3.

FIGS. 3 and 4, like FIGS. 1 and 2, show a cross section through one wall of another hollow body using a different plastic channel. To increase the stability of the middle flanges 5 and 6, diagonal lines truss webs 10 are provided. In this manner, too, additional chambers or passages 13, 14, 15, are formed in the wall of the hollow body. Different fluids, for example, can be carried thereby in order to achieve an exchange of heat.

Figure 5:
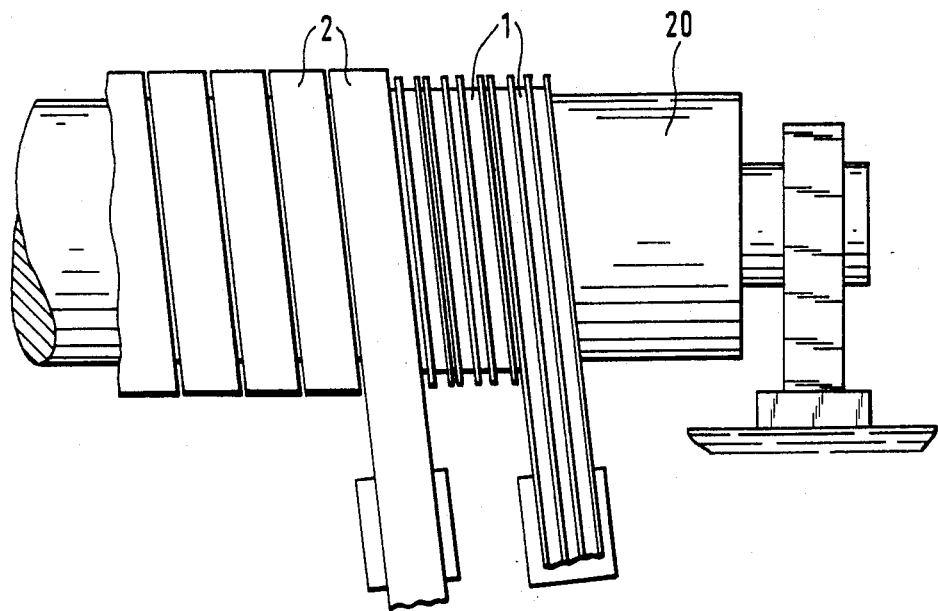
FIG. 5 is a side elevational view of an apparatus for making the hollow body.

Finally, FIG. 5 shows diagrammatically, the production of a hollow body by using top and bottom channels 1 and 2. First, the bottom channel is wound spirally onto a winding core or mandrel 20, with the individual turns lying tightly together. Then the top channel 2 is snapped over the bottom channel 1, but is first offset by half of the width of a channel and, if necessary, is also cemented or welded in place.

The flexibility in the manufacture of hollow bodies is considerably greater when the channels according to the invention are used than in the current state of the art. For example, the open E channels can be wound to a considerably smaller diameter than the closed hollow profiles currently employed. Moreover, the bottom channel 1 and top channel 2 can be manufactured from different materials. For example, one of the channels can be made of transparent, chemical-resistant or weather-resistant material, and the other channel can be made from a less expensive material.

In any case, it is possible to bring the open E channel in the form of a coil from the factory to the site where it can then be made into the finished container. This permits the production of light, inexpensive and yet stable hollow bodies, such as containers, for example, by using a single, inexpensively extrudable and transportable plastic channel material.

While specific embodiments of the invention have been shown and described in detail to illustrate the application of the principles, it will be understood that the invention may be embodied otherwise without departing from such principles.

What is claimed is:

1. A hollow body comprising a bottom spirally wound channel having turns with adjacent side walls lying closely against each other, and a top spirally wound channel inter-engaged with said bottom channel, said top channel having turns with adjacent side walls lying closing against each other, said top and bottom channels each having an E-shaped cross section with a base web having two outer limbs each carrying one of the side walls of the channel, and two spaced apart middle limbs, said two middle limbs of one channel being spaced apart by a distance to closely receive the outer limbs of two adjacent turns of the other channel, said two middle limbs of one channel having inner side surfaces which engage inner side surfaces of the outer limbs of two adjacent turns of the other channel.

2. A hollow body according to claim 1, wherein each channel comprises a plastic extruded channel.

3. A hollow body according to claim 2, wherein the cross-sectional shape of said top and bottom channels is identical.

4. A hollow body according to claim 2, wherein said two middle limbs of one channel are spaced apart by the thickness of two outer limbs of the other channel.

5. A hollow body according to claim 1, wherein said inner side surfaces of said middle and outer limbs are provided with undercuts in the form of a sawtooth.

6. A hollow body according to claim 1, wherein each channel includes a truss web extending from one middle limb to said base web.

7. A hollow body according to claim 6, wherein each truss web extends at an angle to each middle limb and to said base web of each channel.

8. A hollow body according to claim 1, wherein said bottom channel is made of material which differs from that of said top channel.

9. A hollow body according to claim 8, wherein said top channel is made of transparent plastic.

10. A hollow body according to claim 8, wherein said bottom channel is made of chemical-resistant plastic.

11. A hollow body according to claim 1, including a reinforcing insert lying in said bottom channel between each pair of middle and outer limbs.

12. A hollow body according to claim 11, wherein said reinforcing insert comprises a fiber ribbon.

13. A hollow body according to claim 11, wherein said reinforcing insert comprises a steel band.

14. A hollow body according to claim 2, wherein the middle limbs of one channel are permanently connected to the outer limbs of the other channel by one of welding and cementing.

* * * * *

UNITED STATES PATENT AND TRADEMARK OFFICE
CERTIFICATE OF CORRECTION

PATENT NO. : 4,903,736

DATED : February 27, 1990

INVENTOR(S) : Artur Baston et al

It is certified that error appears in the above-identified patent and that said Letters Patent is hereby corrected as shown below:

Column 4, line 25, change "closing" to --closely--.

Signed and Sealed this

Thirteenth Day of August, 1991

Attest:

HARRY F. MANBECK, JR.

*Attesting Officer*     *Commissioner of Patents and Trademarks*